United States Patent [19]

Young

[11] Patent Number: 5,322,463
[45] Date of Patent: Jun. 21, 1994

[54] PROCESS AND APPARATUS FOR ASSEMBLING A LASER

[75] Inventor: Li Young, Bridgewater, N.J.

[73] Assignee: AT&T Bell Laboratories, Murray Hill, N.J.

[21] Appl. No.: 42,319

[22] Filed: Apr. 2, 1993

[51] Int. Cl.⁵ .............................................. G02B 6/42
[52] U.S. Cl. ......................................... 445/4; 445/28; 445/64; 29/468; 29/593; 29/705
[58] Field of Search ....................... 385/33, 52, 90, 91, 385/93, 49, 51; 445/4, 28, 64; 29/593, 705, 468

[56] References Cited

U.S. PATENT DOCUMENTS

| | | | |
|---|---|---|---|
| 4,790,618 | 12/1988 | Abe | 385/33 |
| 4,817,849 | 4/1989 | Yamamoto et al. | 29/593 X |
| 5,215,489 | 6/1993 | Nakamura | 445/4 |

Primary Examiner—Kenneth J. Ramsey
Attorney, Agent, or Firm—Richard J. Botos

[57] ABSTRACT

A process for assembling a laser and an apparatus used to assemble a laser is disclosed. The laser contains, among other components, a semiconductor chip, a lens and an optical fiber. The chip and lens are disposed in a housing. The optical fiber is disposed in a transmission assembly. The process replaces a tedious manual method for aligning the lens housing and the transmission assembly. The process uses an apparatus which separates each of the plurality of leads on the lens housing from each other. The apparatus restrains the lens housing while the housing is placed in contact with the transmission assembly. The apparatus provides electrical contacts which are placed into electrical connection with the leads on the lens housing. Electrical current is then provided which is conducted to the chip. The chip generates a beam of light which is focused by the lens into the fiber and then transmitted by the fiber. The power of the beam of light in the fiber is measured. The position of the lens housing relative to the transmission assembly is automatically adjusted until the power of the beam of light reaches an acceptable level. The lens housing is then fastened to the transmission assembly and the resulting laser, assembled and aligned, is released from the apparatus. Another lens housing is conveyed into the apparatus and the process is repeated.

10 Claims, 4 Drawing Sheets

PROCESS AND APPARATUS FOR ASSEMBLING A LASER

BACKGROUND OF THE INVENTION

1. Field of the Invention

The present invention relates to an automated process and apparatus for assembling and aligning a laser.

2. Art Background

Lasers are complex devices that consist of many components. Certain lasers contain, among other components, a lens for focusing the radiation to produce a high intensity beam of light and a transmission assembly. The transmission assembly conducts the high intensity beam of light to a location remote from the lens. The high intensity beam of light is used for a number of different purposes well known to people familiar with these types of devices.

The lens and the transmission assembly are operatively connected together. In certain instances, the lens is preassembled in a lens housing and the transmission assembly is an optical fiber that is preattached to a ferrule and sleeve subassembly. To complete the laser assembly, the ferrule/sleeve subassembly is operatively coupled to the preassembled lens housing.

The lens housing and the ferrule/sleeve assembly cannot simply be connected to ensure acceptable laser operation, however. The lens housing and the ferrule/sleeve assembly must be coupled together in a manner that ensures that the lens and optical fiber are in proper alignment. If the lens and the optical fiber are not properly aligned, the power of the light transmitted by the fiber is unnecessarily low.

Currently, a complex manual manipulation of the lens housing and the ferrule/sleeve assembly is performed to align and assemble these components. First, the four leads extending from the lens housing are inserted into a socket. The socket also has leads extending from it. Each of the leads is inserted into a separate opening in the socket. When the lens housing leads are placed in the socket openings, an electrical connection between the lens housing leads and the socket leads is formed.

The lens housing leads are made of thin gauge wire and are easily bent. However, although these wires are easily bent, it is time consuming and difficult to properly place such wires in a corresponding opening in the socket. Furthermore, because these wires are easily bent, it is possible to bend them into contact with each other.

The lens housing is then connected to the ferrule/sleeve assembly, but they are aligned before they are affixed to each other. To align the lens and the optical fiber, the socket leads are connected to a source of electric power. Electric current is then supplied to the lens housing—ferrule/sleeve assembly. The alignment of the lens is determined by measuring the current supplied to the lens housing and the energy of the beam of light transmitted through the optical fiber.

The way in which these two parameters indicate the alignment of the lens and the optical fiber is based on the relationship of the components in these types of devices. The beam of light that is focused by the lens and transmitted by the fiber is generated by a device that is also present in the housing. Such devices are typically referred to as chips. The electric current supplied to the chip provides the current necessary for the chip to generate the beam of light.

The chip operates at a certain efficiency. For every chip, a certain amount of electric current (X) will generate a beam of light with a certain energy (Y). Whether the chip is operating at its desired efficiency is determined by measuring the current provided to the housing and the energy of the beam of light from the fiber. If the amount of electric current provided is X, but the energy or power of the beam of light is less than Y, then the chip is not operating at its desired efficiency.

One factor that can effect chip performance is the alignment of the lens and the fiber. If the lens does not properly aim the high intensity beam of light at the fiber, the chip works harder to transmit a less powerful beam of light. The harder the chip works, the more power it consumes.

If the power of the light beam is observed to be unacceptably low based on the electric current provided to the chip, the lens housing and the ferrule/sleeve assembly are moved in relation to each other until the power of the light beam reaches an acceptable level. When the power of the light beam is acceptable based on the electric current provided to the device, the high intensity beam of light is properly aimed at the transmission assembly. The lens housing and the ferrule/sleeve assembly are then affixed to each other by laser welding or some other acceptable means. The process for aligning the housing and the ferrule/sleeve assembly uses conventional methods to manipulate the lens housing relative to the ferrule/sleeve assembly until the power of the light beam transmitted through the optical fiber is acceptably high.

The manual manipulation of the leads into the socket for purposes of testing the alignment of these devices is inefficient and time consuming. The manual placement of the lens housing in an apparatus that will align the housing with the ferrule/sleeve assembly is also time consuming. Therefore, an automated process that assembles and aligns the laser components is desired.

SUMMARY OF THE INVENTION

The invention is directed to an apparatus for assembling a laser or like device. The laser contains several components, two of which are a lens, or other device which produces a high intensity beam of light, and a transmission assembly for this beam of light. The lens focuses a beam of light provided by a device, such as a semiconductor chip, which is also a component of the laser. The transmission assembly contains a component, such as an optical fiber, that transmits a beam of light. In one embodiment, the lens and chip are preassembled into a lens housing and the transmission assembly is adapted to be attached to that housing. The lens housing also has a plurality of leads which are made of an electrically conductive material.

The apparatus automatically separates the lens housing leads, places them in electrical contact with a source of electric power, and aligns the housing with a transmission assembly. The apparatus accomplishes these objectives. Manual manipulation of the lens housing, the lens housing leads or the transmission assembly is therefore not required.

The lens housing is placed on a conveying apparatus. The conveying apparatus is adapted to separate the leads attached to the lens housing as the lens housing is placed on the conveyor. The conveying apparatus then moves the lens housing into the confines of an aligning apparatus. The aligning apparatus has a lens housing holder and a plurality of contact points. The lens housing holder has an open and a closed position. When the lens housing holder is in the open position, the aligning apparatus receives the lens housing. When the lens housing holder is in the closed position, it restrains the lens housing from movement and places each of its several contact points in contact with one of the plurality of leads. The lens housing does not have to be removed from the conveying apparatus for the aligning apparatus to perform its intended function.

While the lens housing is being restrained in the aligning apparatus, the transmission assembly is placed in contact with the lens housing. The transmission assembly and the lens housing are not fastened to each other at this point in the process, however. Electrical current is then provided to the leads of the lens housing via the contact points. The electric current provided to the leads is measured. The power of the light beam transmitted by the optical fiber is also measured. These measurements are made by conventional means.

These two measurements are then compared with the desired performance of the chip. If the measured power of the light beam is less than it should be based upon the desired chip performance and the electric current provided to the chip, that indicates that the lens and optical fiber are not acceptably aligned.

The lens and the optical fiber are aligned by adjusting the position of the lens housing relative to the transmission assembly. The position of the lens housing is adjusted by a positioning mechanism that moves the lens housing, and the aligning apparatus in which it is retained, in the lateral and in the lengthwise directions. The positioning mechanism is a conventional X-Y positioning device that is adapted to operate in conjunction with the aligning apparatus.

The lens housing is incrementally repositioned until the beam of light from the fiber has the desired power. This iterative repositioning is accomplished using conventional means adapted to the aligning apparatus. The aligning apparatus is equipped with a sensing function that stops the positioning mechanism once it senses that the beam of light has the desired power. This function is also performed manually by turning off the positioning mechanism once a beam of light with the desired power is observed. The lens housing and the transmission assembly are then attached to each other by any suitable expedient, such as welding.

The assembled laser is then released from its fixed position in the aligning apparatus and the conveying apparatus then conveys the assembled laser from the confines of the aligning apparatus. Another lens housing is conveyed into the confines of the aligning apparatus as described above and the process is repeated.

A process for assembling a laser or like device is also disclosed. According to this process, the leads attached to the housing for the chip and lens, or other like device, are simultaneously separated from contact with each other as they are placed on a unit of material with wedge-shaped portions that cause the leads to be separated. The housing, while so placed on the unit of material, is conveyed within the confines of an aligning apparatus. The aligning apparatus electrically connects the leads to a source for electric current. By placing the housing on the unit of material, the leads are positioned for this connection. A transmission assembly is operatively connected to the housing but not attached to it.

Electric current is provided to the housing/transmission assembly. The electric current provided to the housing assembly is measured. The power of the beam of light transmitted by the optical fiber is also measured. The power of the beam of light so measured is compared with the power that the beam of light should have, based upon the desired performance of the chip and the electric current provided to the chip. If the measured power of the light beam is less than ninety-five percent of the power it should have, the position of the housing relative to the transmission assembly is automatically adjusted. When the measured power is ninety-five percent or more of the desired power, the housing is fixed to the transmission assembly.

DETAILED DESCRIPTION

In the following detailed description reference will be made to a device that generates a high intensity beam of light, e.g., a semiconductor chip in combination with a lens, coupled to a mechanism for transmitting the output from that device, e.g., an optical fiber. The lens, which is preassembled in a housing, is coupled to the optical fiber, which is preassembled in a transmission assembly, to form a laser. The transmission assembly is adapted to fit with the housing. The process and apparatus specifically described relate to assembly of this particular type of laser. However, this process and apparatus is useful for assembling other types of lasers and other devices which pose similar assembly and alignment difficulties. Therefore, the references to a laser are intended to be exemplary references to a generic type of device which requires complex manipulation and alignment to assemble.

Figure 1:
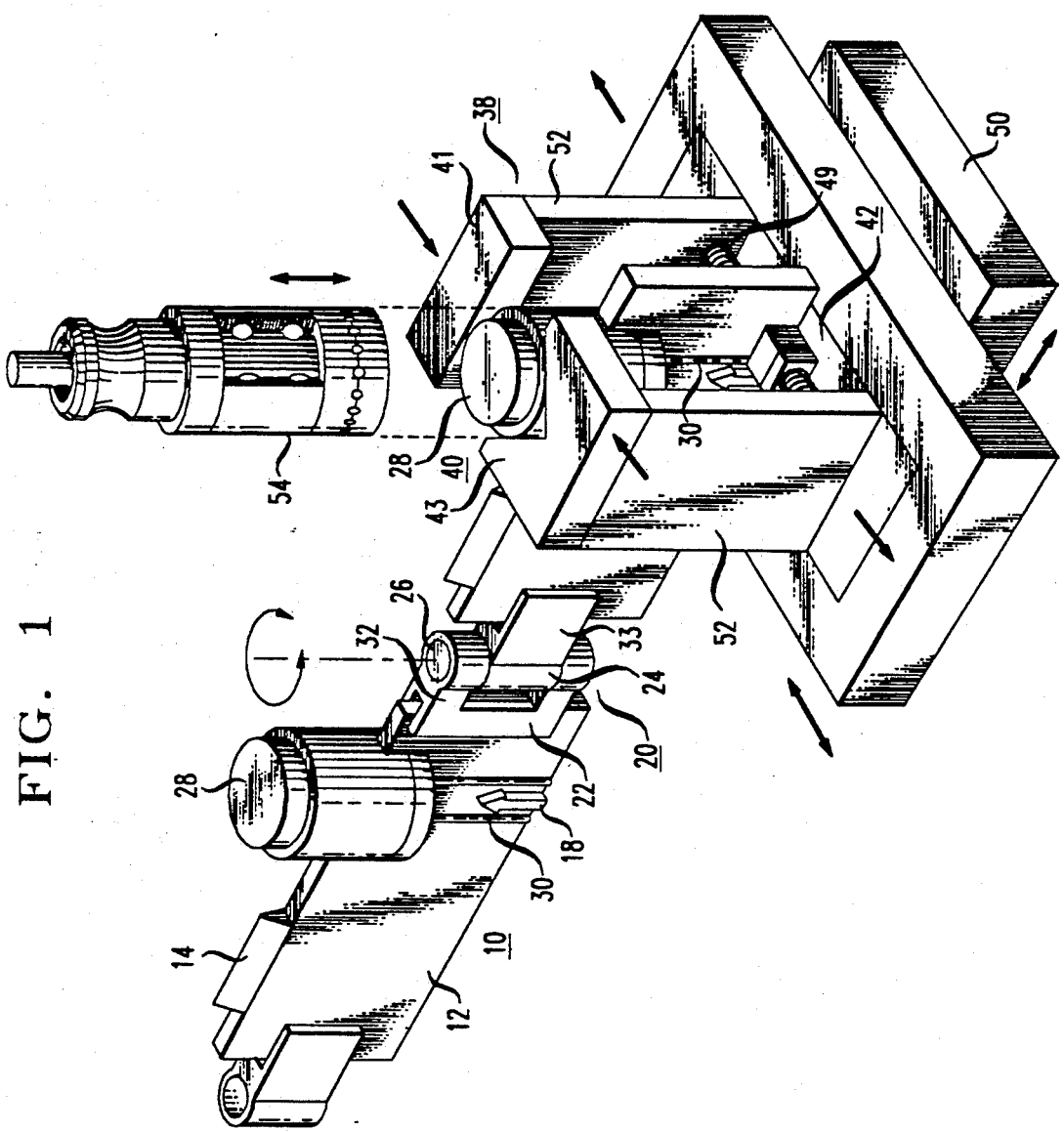
FIG. 1 is an isometric view of an embodiment of the apparatus.

A specific embodiment of the invention is illustrated in FIG. 1. A conveying apparatus 10 is adapted to receive a lens housing 28 and to convey that housing 28 into the confines of an aligning apparatus 38. The lens housing 28, once conveyed into the confines of the apparatus 38, is restrained from movement by a holder 40. The holder has gripping portions 41 and 43 which, when in their closed position, restrain lens housing 28 from moving independently of the apparatus 38.

The holder 40 is moved from its open to its closed position by the inward motion of walls 52 of the aligning apparatus 38. The holder 40 is moved from the open to the closed position in any one of a number of ways available to one skilled in the art. The holder 40 can be operated pneumatically, electrically, or hydraulically, for example. The inward motion of the walls 52 causes the gripping portions 41 and 43 to close onto and grip the lens housing 28, thus restraining it from moving independently of the aligning apparatus 38. The inward and outward movement of the walls 52 is illustrated by the arrows in FIG. 1. The mechanism used to control the inward and outward movement of the walls 52 is not shown. However, knowledge of such a mechanism and the ability to construct such a mechanism that will operate in conjunction with the disclosed apparatus is available to those skilled in the art.

Figure 4:
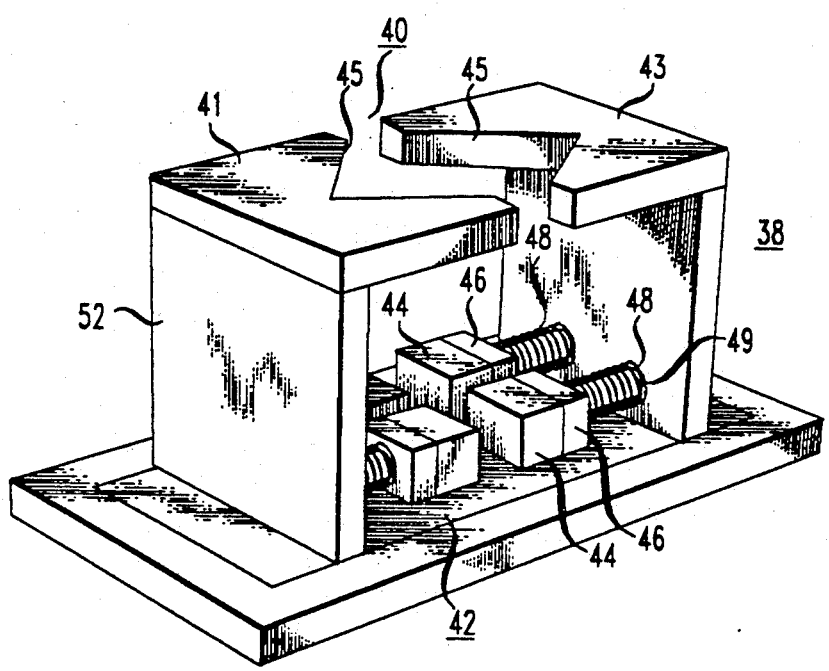
FIG. 4 is an isometric view of an alternate embodiment of the aligning apparatus with the lens housing holder in the open position.

The aligning apparatus 38 also has a contact means 42. Once the lens housing 28 is conveyed into the confines of the apparatus 38, the contact means 42 are moved into contact with the leads 30 of the lens housing 28. This movement is also provided by the inward motion of the walls 52. As illustrated in FIG. 4, the aligning apparatus provides a contact means 42 for each of the leads 30.

Preferably, the contact means 42 are compressibly attached to the walls 52. The contact means 42 are compressible in the same direction as the movement of the walls 52 to which they are attached. Consequently, when the contact means connect with the leads 30, the walls 52 can continue their forward motion until housing 28 is adequately gripped. The compressibility of the contact means 42 permits this continued forward movement of the walls 52 even after the contact means have firmly connected to the leads 30. The compressibility of contact means 42 is provided by a spring 49 or other compressible material. This spring 49 is provided over the contact connector 48 (FIG. 4).

The compressibility of the contact means 42 also assists in maintaining good contact between the contact means 42 and the leads 30. The tension provided by the compressed contact means 42 maintain good electrical contact between the individual contact means and the individual leads.

After the lens housing 28 is restrained from movement in the aligning apparatus 38 by the holder jaw 40 in the closed position, the ferrule/sleeve assembly 54 is lowered onto the lens housing 28 for alignment and assembly. The mechanism used to lower the ferrule/sleeve assembly 54 onto the housing 28 is not shown. Such a mechanism is constructed using conventional means. The arrow illustrated next to ferrule/sleeve assembly 54 indicates the direction in which the ferrule/sleeve assembly is lowered onto the lens housing 28 and the direction in which the ferrule/sleeve housing assembly is removed from the aligning apparatus 38. The ferrule/sleeve assembly 54 is not affixed to the lens housing 28 immediately, but is aligned in a manner which will be described further on in this discussion.

Figure 2:
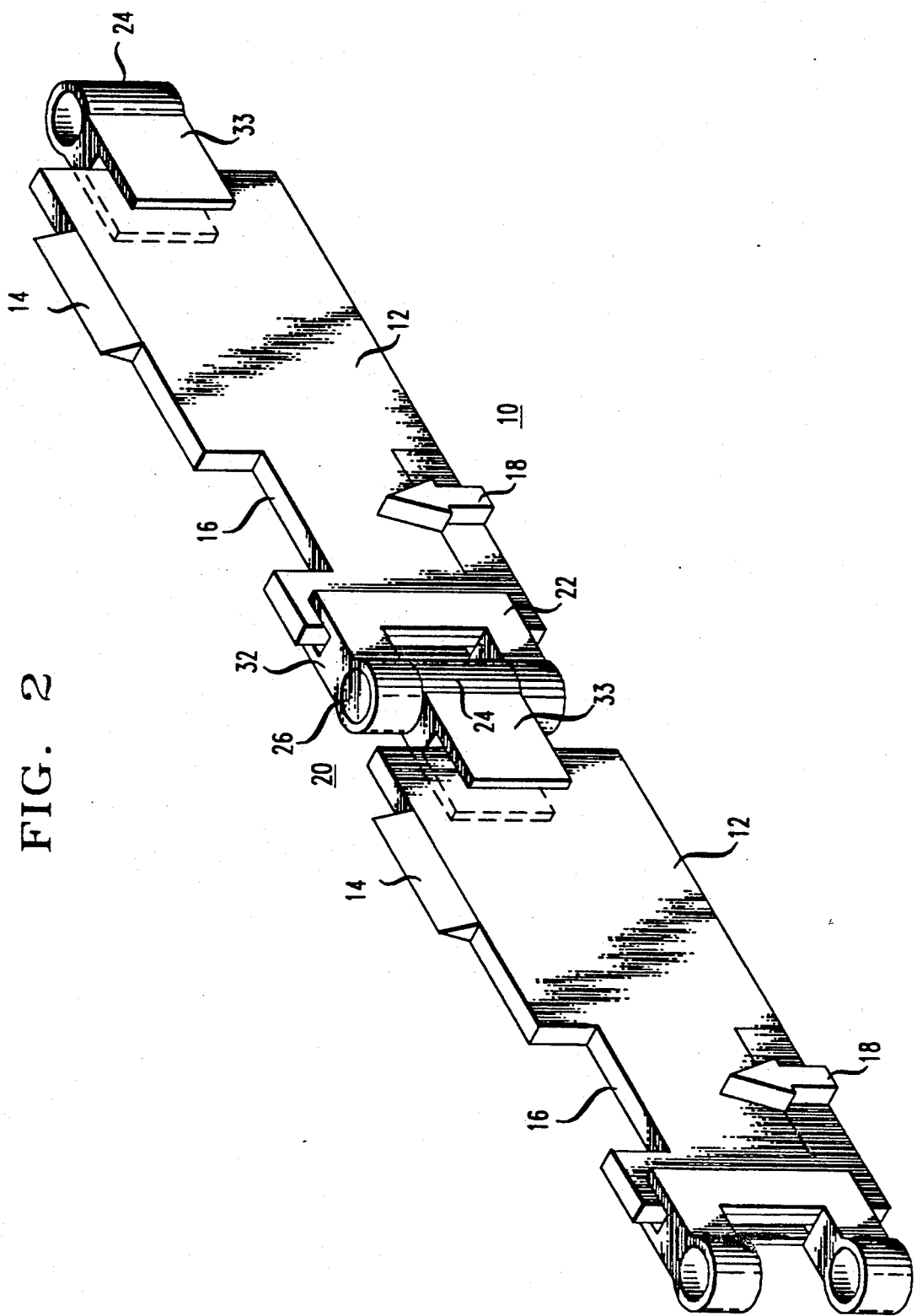
FIG. 2 is an isometric view of a portion of the lens housing conveyor.

Referring to FIG. 2, this illustrates a segment of the conveying apparatus 10. The conveying apparatus 10 transports the lens housing 28 (FIGS. 1 and 3) into the confines of the aligning apparatus 38. Individual units 12 of the conveying apparatus 10 are joined together by a linking coupling 20. Units 12 are made of a material that does not conduct electricity, for reasons that will be explained in detail later on in this description. Preferably, units 12 are made of rigid or semi-rigid plastics such as polyvinylchloride (PVC) and the like materials. Examples of other suitable plastics include Vespel ® and Delrin ®. Both are trademarks of the DuPont de Nemours Co.

The units 12 have a first lead separating wedge 14. This wedge will separate some of the leads 30 (FIG. 3) on the lens housing 28 (FIG. 3) from other leads 30. The units 12 also have a recessed portion 16 and lead separating wedge 18. The functions of wedges 14 and 18 and recess portion 16 are fully explained in FIG. 3 and the text that describes FIG. 3. Wedge 18 is provided on both sides of unit 12.

As illustrated in FIG. 2, a linking coupling 20 joins two units 12 of the conveying apparatus 10 together. Although only two units 12 are depicted in FIG. 2, the conveying apparatus 10 has at least several units 12. All of the units 12 in the conveying apparatus 10 are joined together. One example of how these units are linked together is illustrated in FIG. 2. There are many other ways that are contemplated to link the units 12 together which will serve the objectives of this invention. These alternatives are apparent to one skilled in the art.

The linking coupling 20 has two portions 22 and 24 which are both pivotally mounted on pin 26. Portions 22 and 24 are adjacent to each other, but not attached. This pivotal connection permits each unit body 12 to move to a certain extent without corresponding movement by adjacent units. This motion is indicated by the circular arrow in FIG. 1. Portions 22 and 24 are each affixed to a different unit 12. Portion 22 has arms 32 which couple the unit 12 to the pin 26. The arms 32 are joined to unit 12 in any acceptable manner. Similarly, arms 33 are provided to couple the pin 26 to a different unit 12 via portion 24 of linking coupling 20. This connection is shown in phantom.

Figure 3A:
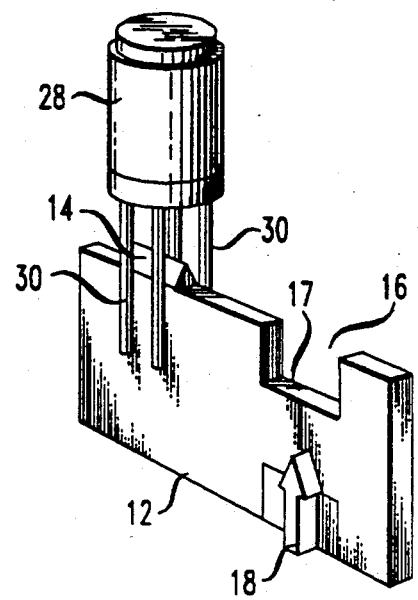
FIGS. 3a, 3b, and 3c are progressive illustrations of how the lens housing is placed on the conveyor.
Figure 3B:
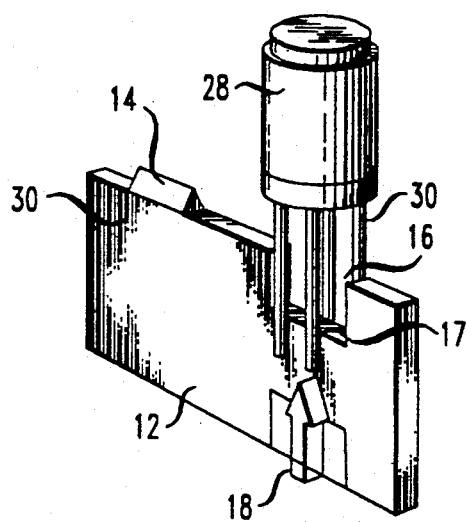
Figure 3C:
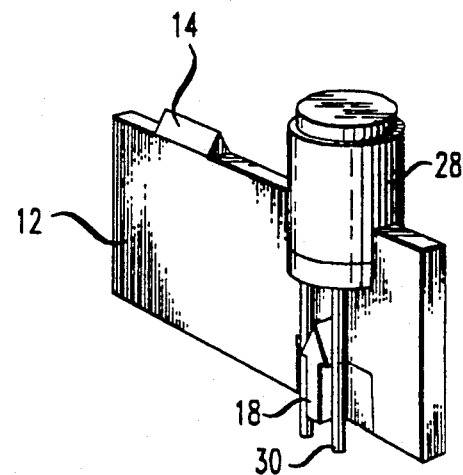

FIGS. 3a, 3b, and 3c illustrate the progressive placement of the lens housing 28 onto one of the units 12. Referring first to FIG. 3a, the lens housing is lowered onto the unit 12 directly above the first wedge 14. Wedge 14 is positioned relative to the leads 30 such that two of the leads 30 are on one side of the unit 12 and the other two leads 30 are on the other side of unit 12.

Next, as shown in FIG. 3b, the lens housing 28 and the unit 12 are positioned relative to each other so that the lens body 28 is above the recessed portion 16 of the unit 12. Note that the depth of the recess portion 16 is limited so that a portion of the unit 12 is between the two pairs of housing leads 30 as the lens housing is lowered onto recessed portion 16.

The leads 30 are sufficiently long to stabilize the lens housing 28 on unit 12. Alternately, however, recessed portion 16 is designed to retain the lens housing 28 on unit 12 of the conveyor 10 with sufficient force to keep the lens housing 28 on the conveyor 10 despite the movement of the conveyor 10 on the aligning apparatus 58. This is accomplished using conventional means, such as by making the notch width the same dimension as the housing diameter to ensure that the housing 28 fits snugly on the unit 12.

As shown in FIG. 3c, as the lens housing 28 is positioned into the recessed portion 16 of the unit 12, the second lead separating wedge 18 separates two of the leads 30. This lead separating wedge is provided on both sides of unit 12. Unit 12 separates two of the leads 30 from the other two leads 30. The leads 30 are so separated to prevent them from contacting each other while the laser is being assembled and aligned.

The leads 30 are made of a material that conducts electricity. The material, when configured to function as electrical leads for the described devices, is also positioned by the disclosed apparatus as described. One example of such a material is Covar, a gold plated alloy. Many other materials which are suitable from a conductivity and from a mechanical standpoint are contemplated.

FIG. 4 illustrates the aligning apparatus 38 used to assemble the laser components. Aligning apparatus 38 has a holder 40 which restrains the lens housing in the aligning apparatus. The holder 40 has two gripping portions 41 and 43. The gripping portions 41 and 43, illustrated in FIG. 4, have notched shaped gripping surfaces 45. These gripping surfaces 45 are provided for restraining the lens housing 28 from movement when the holder 40 is closed (FIG. 1).

Many different gripping configurations that will effectively restrain the lens housing 28 from movement are contemplated, however. For example, gripping portions 41 and 43 that have flat portions or rounded portions are contemplated. Also, gripping portions 41 and 43 that do not have the same gripping surface configuration are contemplated. For example, a gripping portion 41 that has a flat surface and a gripping portion 43 that has a wedged gripping surface as illustrated in FIG. 1 are contemplated.

The aligning apparatus 38 also has a tension mounted contact means 42 as previously described. These contact means 42 have an electrical contact 44, an insulating portion 46, and a connector 48. The contact connectors are preferably tension mounted as previously described to ensure that a good electrical contact is formed between the contacts 44 and the leads 30. Embedded in the connector 48 is a wire (not shown) which connects the electrical contact 44 with a source for electric current. The source for electric current is also not shown.

A number of different events can trigger the opening and closing of the holder. For example, when the conveyor 10 stops with the housing 28 in the confines of the apparatus 38, the holder 40 is closed. Similarly, after the housing 28 is fixed to the ferrule/sleeve 54, the holder 40 opens.

When the jaws 40 are closed on the lens housing 28 via the inward movement of walls 52, the contact means 44 are also pushed forward by walls 52. The contacts 44 are each placed in contact with one of the lens housing leads 30 in this manner.

The position of the lens housing 28 is adjusted, if necessary, to align the housing with the ferrule/sleeve assembly (FIG. 1). In FIG. 1, an alignment positioner 50 is illustrated. This positioner 50 provides the necessary adjustment capability. The alignment positioner 50 moves the entire aligning apparatus 38 in the lateral or the lengthwise direction (also referred to as the X-Y direction), as required to make the necessary adjustment. Such positioners are commercially available and it is within the ability of one skilled in the art to adapt one for use with this aligning apparatus based upon the instruction provided by this description. An example of such a positioner is Model No. 105000, manufactured by the Dadel Division of the Parker Hannefin Co. The positioner is also operated by any known mechanical means, i.e., electrically, pneumatically, or hydraulically. The directions in which the positioner 50 moves the aligning apparatus is indicated by arrows in FIG. 1.

Since the lens housing 28 is aligned with the ferrule/sleeve assembly while it is astride the conveyor 10, the conveyor 10 must not restrict or otherwise interfere with the movement of the aligning apparatus 38. Although, the coupling 20 provides some freedom of movement, it is preferred that the conveying apparatus 10 also be unlocked when the conveyor is not moving so that the conveyor will not provide resistance to the operation of the holder 40. How to unlock the conveying apparatus 10 will be apparent to those skilled in the art. By "unlock" it is meant that the tension under which the conveyor operates is relaxed.

The alignment of the lens housing with the transmission assembly is observed by measuring the electric current provided to the housing, in amps, and the power of the beam of light in the optical fiber, in watts. Electrical current is provided to the contacts 44 as previously described and this electrical current then travels through the lens housing leads 30 and into the lens housing 28. The housing 28 remains on the unit 12 of the conveyor 10 during the alignment step. It is for this reason that unit 12 is made of material that does not conduct electricity.

The measured power of the beam of light is compared with the power that the beam of light should have based upon the electric current provided to the chip and the desired or target chip performance. If the measured power of the beam of light is less than ninety-five percent of the power that the beam of light should have, the lens housing 28 is moved relative to the ferrule/sleeve assembly 54 by the alignment positioner 50. The power of the light beam and the electric current are measured by any acceptable technique. A conventional apparatus is employed to control the movement of the positioner 50 relative to the observed voltage drop across the housing/ferrule/sleeve assembly.

Once the measured power of the light beam is ninety-five percent or more of the power that the light beam should have, acceptable alignment is achieved. The lens housing 28 and the ferrule/sleeve assembly 54 are then attached together using laser welding or some other acceptable means.

Holder 40 then moves to its open position and the conveying means 10 carries one assembled laser (not shown) out of the aligning means 38, and carries another unit 12 with another lens housing 28 astride it into the aligning means 38.

It will be recognized that the principles and concepts disclosed here are capable of broad application. These concepts should not be restricted by the structure specifically described above which serves to illustrate the invention defined by the claims.

I claim:

1. A process for assembling a device comprising:
    placing a housing comprising a device that generates a high intensity beam of light and a plurality of leads into operational association with a transmission assembly comprising a component that is adapted to receive a high intensity beam of light and to transmit that high intensity beam of light away from the device;
    electrically connecting the housing leads to a source of electrical current, the housing leads having been prepositioned for electrical connection by placing the housing on a unit of material comprising wedge-shaped portions that are configured to separate the housing leads from contact with each other and to position the leads for electrical connection as the housing is placed on the unit of material;
    supplying electrical current to the housing leads from the source of electrical current;
    measuring the electrical current supplied to the housing leads;
    measuring the power of the high intensity beam of light from the transmission assembly;
    adjusting the position of the housing relative to the transmission assembly until the light beam has the desired power;
    attaching the housing to the transmission assembly; and
    removing the housing from the unit of material.

2. The process of claim 1 wherein the unit of material is a material that has low electrical conductivity.

3. The process of claim 2 wherein the unit of material is a plastic material.

4. The process of claim 1 wherein the housing is fixed to the transmission assembly by welding.

5. The process of claim 1 wherein the device has a target efficiency and the desired power is at least ninety-five percent of the power of a light beam generated by a device operating at that target efficiency.

6. An apparatus for assembling and aligning a laser comprising:

a conveying means for transporting a housing with a plurality of leads, the conveying means comprising a plurality of units, each unit adapted to receive at least one housing and further adapted to separate each of the plurality of leads from contact with each other as the unit receives the housing;

the conveying means being in operational association with an aligning means, the aligning means being adapted to receive the housing and to restrain the housing from moving independently from the aligning means without removing the housing from the conveying means, the aligning means comprising a plurality of contacts, the contacts numbering at least as many as the leads on the housing, each of the plurality of contacts positioned to electrically connect to one of the leads of the housing when the housing is received and restrained by the aligning means, and a positioning mechanism which is movably connected to the aligning means, the positioning mechanism adapted to move the aligning means and the housing restrained in the aligning means relative to a component adapted to be placed in operational association with the housing.

7. The apparatus of claim 6 wherein the housing further comprises a semiconductor chip that generates a beam of light and a lens that focuses that light into the component and the component comprises an optical fiber that transmits the beam of light and the positioning mechanism further comprises a means for measuring an electrical current supplied to the electrical contacts, a means for measuring the power of the beam of light transmitted by the component when electrical current is supplied to the electrical contacts and when the component is in operational association with the housing, a means for determining, based upon the measured current and the measured power, whether the position of the housing must be changed relative to the component, and a means for directing the movement of the positioning mechanism.

8. The apparatus of claim 7 wherein the semiconductor chip has a desired operating efficiency and the means for determining whether the position of the housing must be changed continues to reposition the housing relative to the component until the power of the beam of light is ninety-five percent of the power of a beam of light that is generated by the semiconductor chip operating at its desired efficiency.

9. The apparatus of claim 6 wherein the units of the conveying means are made of a non-conducting material.

10. An apparatus for assembling a lens housing to a transmission assembly to form a laser comprising:

a conveyor adapted to receive an assembly comprising a lens housing, a lens fixed in the housing and a plurality of leads extending from the housing, the conveyor further adapted to separate the plurality of leads from physical contact with each other as the assembly is received by the conveyor;

a lens housing aligner in operational association with the conveyor, the lens housing aligner adapted to receive the lens housing from the conveyor, and comprising a lens housing holder with a first position and a second position, the conveyor moving the lens housing into the aligner when the lens housing holder is in the first position and the lens housing holder restraining the lens housing from movement in the aligner when the lens housing holder is in the second position, a means for gauging the alignment of the lens housing to a transmission assembly, and a means for adjusting the position of the lens housing relative to the transmission assembly that is responsive to the gauging means.

* * * * *